United States Patent [19]

Tomsic et al.

[11] 4,120,193
[45] Oct. 17, 1978

[54] LEAK-DETECTING APPARATUS

[75] Inventors: Walter J. Tomsic, Warren; Floyd E. Hamilton, Detroit, both of Mich.

[73] Assignee: Uniroyal, Inc., New York, N.Y.

[21] Appl. No.: 796,285

[22] Filed: May 12, 1977

[51] Int. Cl.² ............................................. G01M 3/16
[52] U.S. Cl. .......................................... 73/40; 425/33
[58] Field of Search ................... 73/40, 40.5 R, 49.2, 73/49.3; 425/33

[56] References Cited

U.S. PATENT DOCUMENTS

| | | | |
|---|---|---|---|
| 2,645,117 | 7/1953 | Bendix et al. | 73/49.2 |
| 3,029,469 | 4/1962 | Moore et al. | 425/33 |

FOREIGN PATENT DOCUMENTS 2,314,981  10/1974  Fed. Rep. of Germany ............. 73/40

Primary Examiner—Richard C. Queisser
Assistant Examiner—Joseph W. Roskos
Attorney, Agent, or Firm—Charles A. Blank

[57] ABSTRACT

Leak-detecting apparatus for a tire-vulcanizing press which is extremely sensitive and is capable of monitoring minute leaks in a diaphragm or bag in the region of the bottom of the bag susceptible to cracking and removed from the vicinity of the leak-detecting apparatus which ordinarily is at a top plate of the press. The apparatus includes temperature-sensitive resistive means in a normally balanced bridge circuit which is unbalanced by leakage fluid from the diaphragm for indicating a malfunction of the press and also includes a check valve for preventing air from outside the press from entering the vicinity of the temperature-sensitive resistive means.

4 Claims, 4 Drawing Figures

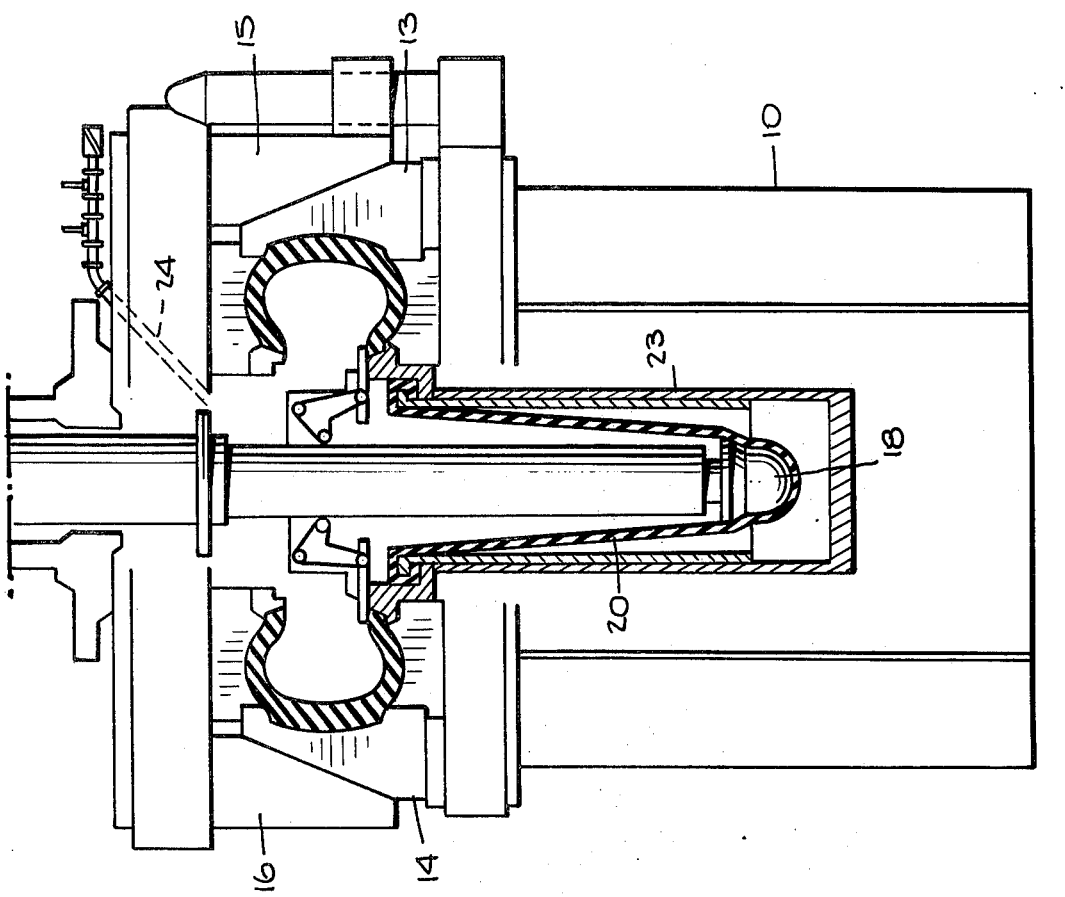
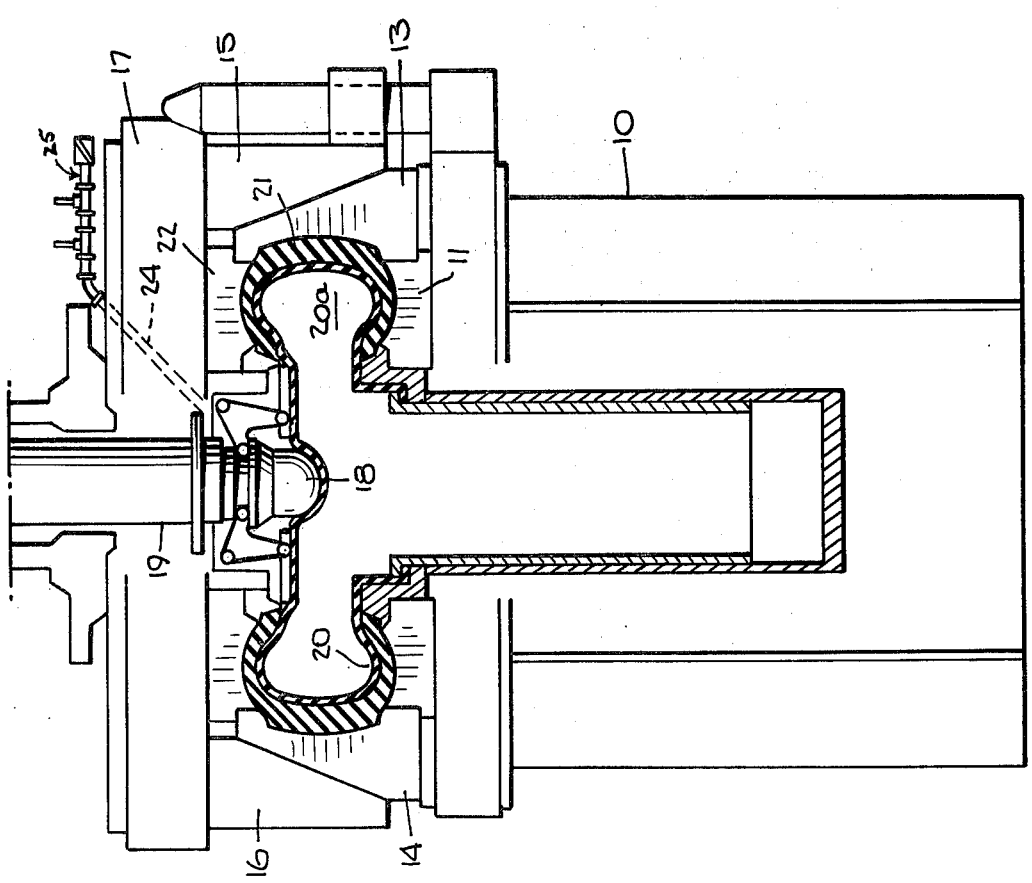

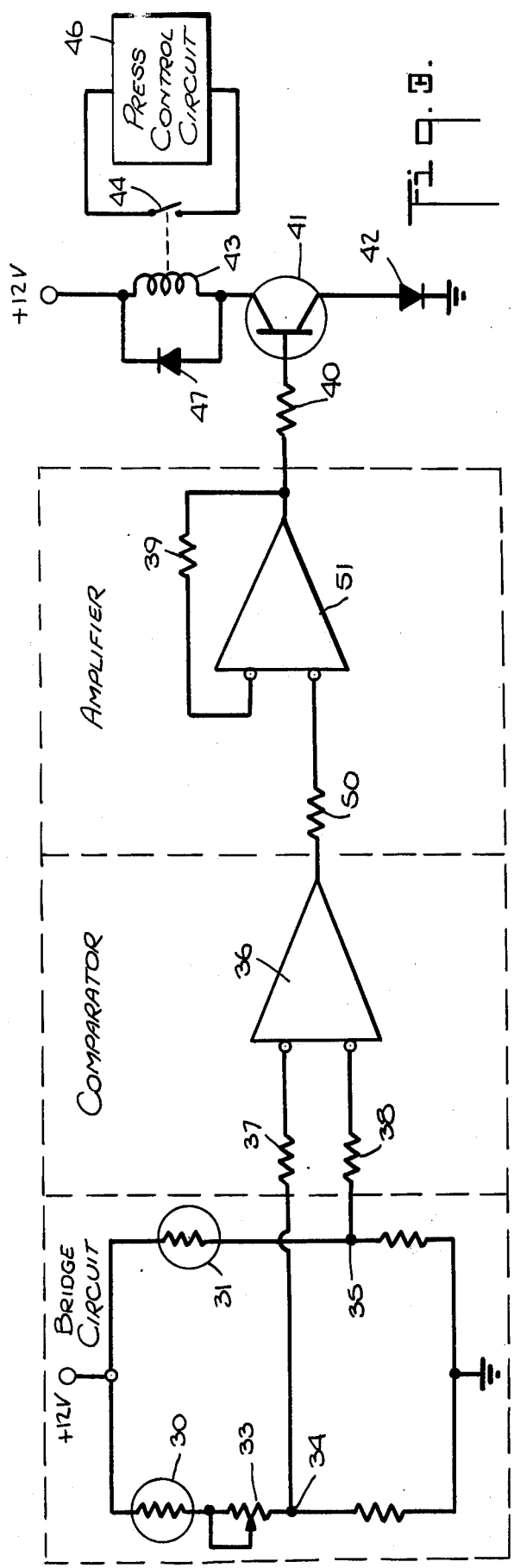
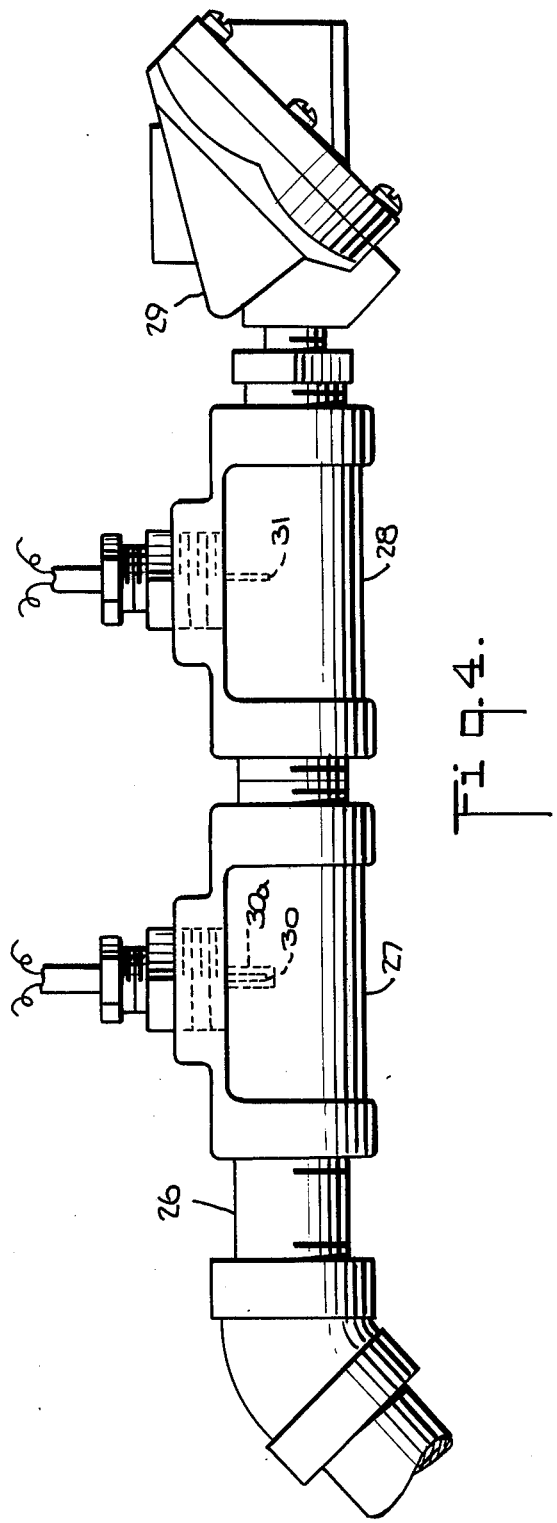
Fig. 4.

LEAK-DETECTING APPARATUS

This invention relates to leak-detecting apparatus for a tire-vulcanizing press.

Heretofore, a leak-detecting device for a tire-vulcanizing press, which device is described and claimed in U.S. Pat. No. 3,029,469, has been widely used successfully with presses of the type shown in U.S. Pat. Nos. 2,495,664 and 2,808,618. The specific embodiments described in U.S. Pat. No. 3,029,469 are subject to the limitation, however, that for some applications such as in presses of the types described in U.S. Pat. Nos. 3,229,329 and 3,097,394, manufactured by NRM Corporation and known as Autoform Vulcanizers, the above-mentioned specific embodiments are not sufficiently sensitive or are too slow in reacting to a minute steam leak to control effectively the detection of leaky diaphragms or bags.

The above-mentioned NRM presses are of the type which includes a bag and ram which is pulled downwardly to eject the bag from the interior of the tire after cure into a bag well located directly below the bottom mold section. In this type of press the bag is clamped only at the bottom end and maximum flexing occurs near the clamped bottom end, rendering this area most vulnerable to cracks and leaks, which are most difficult to detect by a leak-detecting device secured to the bolster or top plate of the press.

It is an object of the present invention, therefore, to provide a new and improved leak-detecting apparatus which avoids one or more of the above-mentioned limitations of prior such apparatus.

It is another object of the invention to provide a new and improved leak-detecting apparatus which is responsive to minute leaks at the bottom end of the diaphragm of a press.

In accordance with the invention, in a fluid-operated tire-vulcanizing press having an operating cycle wherein a fluid-inflatable diaphragm which forms an expansible chamber is utilized in conjunction with heated molds to shape and cure a pneumatic tire positioned between the inflatable diaphragm and the molds, leak-detecting apparatus comprises leakage fluid-transfer means communicating the chamber when a leak occurs in the chamber. The apparatus includes sensing means in the fluid-transfer means and responsive to leakage fluid from the expansible chamber and actuated by the leakage fluid for indicating a malfunction of the press. The fluid-transfer means includes means for preventing air from outside the press from entering the fluid-transfer means in the vicinity of the sensing means.

For a better understanding of the present invention, together with other and further objects thereof, reference is made to the following description, taken in connection with the accompanying drawings, and its scope will be pointed out in the appended claims.

Referring now to the drawings:

FIG. 1 is a fragmentary, sectional view of a tire-vulcanizing press having leak-detecting apparatus constructed in accordance with the present invention;

FIG. 2 is a fragmentary, sectional view of the FIG. 1 press at another stage of operation;

FIG. 3 is a schematic diagram of sensing means utilized in the leak-detecting apparatus of the present invention; and FIG. 4 is a view to an enlarged scale of the leakage-fluid transfer means.

Referring now more particularly to FIGS. 1 and 2 of the drawings, there is represented a fragmentary, sectional view of an Autoform Vulcanizer press manufactured by NRM Corporation and suitable for curing radial tires. The press comprises a frame 10 supporting a bottom mold section 11 and lateral mold segments 13, 14. The mold segments 13, 14 are cooperative with guides 15, 16 for opening the mold segments after curing of the tire. The guides 15, 16 are supported by a bolster or top plate 17. A ram 18 movable in a cylinder 19 is in contact with diaphragm 20 used to contain the steam in an expansible chamber 20a for curing the tire 21. An upper mold section 22 is supported by the top plate 17. As represented in FIG. 2, the ram 18 may be extended downwardly to eject the diaphragm 20 from the interior of the tire after cure into a bag well 23 located below the bottom mold section.

Referring now more particularly to FIG. 3 of the drawings, the sensing means preferably comprises temperature-sensitive resistive means, which may be thermistor probe means, for providing a signal for indicating a malfunction of the press. The temperature-sensitive means preferably comprises one thermistor 30 responsive to the ambient temperature and non-responsive to abrupt changes in ambient temperature. The thermistors 30, 31 are coupled in a normally balanced bridge circuit which is unbalanced when a sudden or abrupt change in ambient temperature occurs due to a leak in the diaphragm of the press. When this occurs, thermistor 31 changes in resistive value rapidly but thermistor 30 does not change in value rapidly because it is enclosed in insulating material, for example, enclosed in ¼ inch copper tubing, delaying any rise in temperature of thermistor 30.

The potentiometer 33 provides an adjustment for the reference level of the bridge circuit at point 34, which preferably is set at a slightly higher level than the sensing potential level at point 35. The adjustment of the potentiometer 33 is the sensitivity control and determines the voltage differential required between the points 34 and 35 before the bridge is unbalanced, that is, before there is a voltage differential sufficient to develop an output signal from a comparator amplifier 36 coupled to the points 34, 35 through current-limiting resistors 37, 38. For example, a voltage difference of 0.7 volt between points 34 and 35 permits a temperature variation of 12° F. to 15° F. before the bridge is unbalanced. The points 34 and 35 may serve as voltage-monitoring terminals. The output circuit of the comparator ammplifier 36 is coupled through a current-limiting resistor 50 to a relay amplifier 51 utilizing a resistor 39 to provide gain control for the relay amplifier. The comparator amplifier 36 and relay amplifier 51 may utilize, for example, a National Semiconductor LM 3900 N quad amplifier.

The amplifier 51 is coupled through a resistor 40 to a transistor 41 which is non-conductive when the bridge circuit is balanced. When the bridge circuit is unbalanced, causing the amplifier 51 to develop a positive output signal, the transistor 41 conducts current through diode 42 and relay 43, energizing the relay 43 to close contacts 44 and thereby energizing press control circuit 46, stopping the operating cycle of the press and lighting a warning lamp. The press control circuit 46 may be of conventional construction, for example, of the type described in U.S. Pat. No. 3,029,469. Diode 42 provides, for example, a 0.7 volt bias between the base and emitter of transistor 41 and prevents any small transient voltage from rendering the transistor conductive. Diode 47 suppresses the counter electromotive force generated by the collapse of the magnetic field of relay 43.

Although the sensing means is constantly monitoring during the curing cycle, leaks near the bottom of the diaphragm 20 of FIG. 1 are best monitored during the downstroke of the ram 18. Leaks near the bottom toe ring area of the tire are sealed by the tire against the diaphragm, but as the ram 18 comes down, the seal is broken, that is, the diaphragm is dislodged from the tire and pulled down by the ram into the bag well. This permits the steam or curing medium to escape from the chamber 20a to the top of the press and out the opening 24 communicating with the leakage fluid-transfer means 25 containing the sensing means.

Referring now to FIG. 4, the leakage-fluid transfer means 25 is represented to an enlarged scale. The leakage-fluid transfer means is attached to a vent pipe from the opening 24 at the top of the press through a thermal insulator 26. The two thermistors 30, 31 are mounted as probes in tee pipes 27, 28 through which leakage steam flows to a check valve 29, which may be a Schrader 3340-V quick release valve, which permits steam to escape but does not permit air to enter the leakage-fluid transfer means in the vicinity of the sensing means. Copper tubing 30a encloses the thermistor 30. In an NRM press, outside air would otherwise be drawn through the leakage-fluid transfer means in the vicinity of the sensing means due to a partial vacuum created during the step of retracting the diaphragm bag into the bag well. This cooler outside air would de-sensitize the thermistors and cause the sensing means to give inaccurate signals or render the sensing means inoperative.

It will be understood that while the leak-detecting device has been described in connection with NRM Autoform Vulcanizer presses, it may be used on tire-vulcanizing presses of other types. It is extremely sensitive having a sensitivity which may be monitored, preset and changed. It is capable of detecting a leak in a diaphragm which is small enough not to damage a tire or perhaps only the one tire in the press.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a fluid-operated tire-vulcanizing press having an operating cycle wherein a fluid-inflatable diaphragm which forms an expansible chamber is utilized in conjunction with heated molds to shape and cure a pneumatic tire positioned between the inflatable diaphragm and the molds, leak-detecting apparatus comprising leakage fluid-transfer means communicating with said chamber when a leak occurs in said chamber, and sensing means in said fluid-transfer means and responsive to leakage fluid from said expansible chamber and actuated by said leakage fluid for indicating a malfunction of the press, said fluid-transfer means including means for preventing air from outside the press from entering the fluid-transfer means in the vicinity of said sensing means.

2. Apparatus in accordance with claim 1 in which said sensing means includes temperature-sensitive resistive means for providing a signal for indicating a malfunction of the press.

3. In a fluid-operated tire-vulcanizing press having an operating cycle wherein a fluid-inflatable diaphragm which forms an expansible chamber is utilized in conjunction with heated molds to shape and cure a pneumatic tire positioned between the inflatable diaphragm and the molds, leak-detecting apparatus comprising leakage fluid-transfer means communicating with said chamber when a leak occurs in said chamber, and sensing means including temperature-sensitive resistive means in said fluid-transfer means and responsive to leakage fluid from said expansible chamber and actuated by said leakage fluid for providing a signal for indicating a malfunction of the press, said fluid-transfer means including means for preventing air from outside the press from entering the fluid-transfer means in the vicinity of said sensing means, said temperature-sensitive means comprising one temperature-sensitive means responsive to the ambient temperature and non-responsive to abrupt changes in ambient temperature and a second temperature-sensitive means responsive to abrupt changes in ambient temperature, said first and second temperature-sensitive means being coupled in a normally balanced bridge circuit which is unbalanced by said leakage fluid.

4. Apparatus in accordance with claim 1 in which said means for preventing air from outside the press from entering the fluid-transfer means in the vicinity of the sensing means comprises a check valve.

* * * * *